United States Patent
Timashev et al.

(10) Patent No.: US 9,015,129 B2
(45) Date of Patent: Apr. 21, 2015

(54) CROSS-PLATFORM OBJECT LEVEL RESTORATION FROM IMAGE LEVEL BACKUPS

(75) Inventors: Ratmir Timashev, Baar (CH); Anton Gostev, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 648 days.

(21) Appl. No.: 13/021,312

(22) Filed: Feb. 4, 2011

(65) Prior Publication Data

US 2011/0196842 A1 Aug. 11, 2011

Related U.S. Application Data

(60) Provisional application No. 61/302,877, filed on Feb. 9, 2010.

(51) Int. Cl.
*G06F 7/00* (2006.01)
*G06F 11/14* (2006.01)

(52) U.S. Cl.
CPC ...... *G06F 11/1469* (2013.01); *G06F 2201/815* (2013.01); *G06F 11/1458* (2013.01)

(58) Field of Classification Search
USPC .......................... 707/674, 678, 679; 714/2, 15
See application file for complete search history.

(56) References Cited

U.S. PATENT DOCUMENTS

| | | | |
|---|---|---|---|
| 6,931,558 B1 | 8/2005 | Jeffe et al. | |
| 7,093,086 B1 | 8/2006 | Van Rietschote | |
| 7,191,299 B1 | 3/2007 | Kekre et al. | |
| 7,254,682 B1 | 8/2007 | Arbon | |
| 7,631,020 B1 * | 12/2009 | Wei et al. | 707/999.204 |
| 8,019,732 B2 * | 9/2011 | Paterson-Jones et al. | 707/674 |
| 8,185,505 B1 * | 5/2012 | Blitzer et al. | 707/679 |
| 8,315,986 B1 * | 11/2012 | Kapoor et al. | 707/679 |
| 2008/0275924 A1 | 11/2008 | Fries | |
| 2009/0094603 A1 | 4/2009 | Hiltgen et al. | |
| 2009/0222496 A1 | 9/2009 | Liu et al. | |
| 2009/0249284 A1 * | 10/2009 | Antosz et al. | 717/104 |
| 2009/0313447 A1 | 12/2009 | Nguyen et al. | |
| 2010/0107158 A1 | 4/2010 | Chen et al. | |
| 2011/0173405 A1 * | 7/2011 | Grabarnik et al. | 711/162 |

* cited by examiner

*Primary Examiner* — Hosain Alam
*Assistant Examiner* — Jieying Tang
(74) *Attorney, Agent, or Firm* — Sterne, Kessler, Goldstein & Fox, P.L.L.C.

(57) ABSTRACT

Systems and methods for restoring file system objects from image level backups of servers. The method receives a selection of an image level backup of a source, file system object(s) to be restored, and restoration parameters identifying a destination. The method initializes and attaches a virtual storage to a virtual appliance and an associated hypervisor. The method stores virtual storage data changes resulting from the file system object restoration in changes storage. The method preserves file system object information, wherein the file system object information corresponds to the source operating system (OS) and file system. The method preserves file system object information such as permissions and ownership through business logic that ensures that the file system object information for restored file system object(s) on the destination match file system object information from the source, even when the method operates on a host running a different OS than the source server.

20 Claims, 10 Drawing Sheets

FIG. 10

CROSS-PLATFORM OBJECT LEVEL RESTORATION FROM IMAGE LEVEL BACKUPS

CROSS-REFERENCE TO RELATED APPLICATIONS

The present application claims the benefit of U.S. Provisional Patent Application No. 61/302,877, filed on Feb. 9, 2010, entitled "Cross-Platform Object Level Restoration From Image Level Backups," which is incorporated by reference herein in its entirety.

FIELD OF THE INVENTION

The present invention is related to methods for recovering file system objects from backups of servers having various file systems. In particular, the present invention relates to methods, systems, and computer program products for recovering specific file system objects from an image level backup.

BACKGROUND OF THE INVENTION

Restoration of individual data objects such as file system objects, electronic files and folders/directories from backups has been a concern throughout the era of the personal computer. Users and system administrators would like the ability to restore individual data objects such as file system objects from full computer images (i.e., image level backups), including, but not limited to, full backups, incremental backups, snapshots, copies, and replicas of a backed up computer, application server, or file server.

Examples of file system objects that typically need to be restored from image level backups include, but are not limited to: a system file; an application executable file from an application server; an application configuration file from an application server; a database file from a database server backup; an individual electronic file or document from a user's home folder from a file server backup; or a directory/folder from a file server backup. For example, a database file from a MICROSOFT™ SQL SERVER™, MYSQL™, MICROSOFT™ Access, SYBASE™, or ORACLE™ database may need to be restored from an image level backup. As would be understood by one skilled in the relevant art(s), database servers, file servers, and other servers run a variety of operating systems (OSs) which in turn support different file systems.

Conventional methods for restoring file system objects from an image level backup include extracting an image level backup, and mounting a virtual disk image as a disk accessible from a computer running an operating system (OS) that supports the file system being restored inside a virtual disk image. While there are tools available which can mount a virtual disk image for the purpose of restoring file system objects from a backup, these tools are unable to preserve directory permissions, file ownership, and other attribute information when the data objects are restored from a computer image that does not run the same OS as the destination for the restored objects because of difference in file systems between the computer image and the destination.

Traditional methods for restoring data objects from an image level backup having various file system types have significant drawbacks. For example, these methods and tools often assume that the OS used to run the backup/restoration tool is compatible with the file system on the mounted virtual disk image, which is not always the case. For example, mounting a virtual disk image of a UNIX or Linux virtual machine to a Windows machine will not enable file and directory attributes to be preserved during restoration. This is because MICROSOFT™ Windows OSs do not implement support for some journaled UNIX and Linux file systems such as the third and fourth extended file systems (ext3 and ext4). Similarly, mounting a virtual disk image of a Windows virtual machine to some UNIX or Linux machines may not enable file and folder attributes to be preserved during restoration. This is because some UNIX and Linux OSs do not implement fully featured support for some Windows file systems such as the New Technology File System (NTFS).

To work around these limitations, some traditional solutions implement custom file system drivers that add support to additional file systems to the OS being used to perform the object level restoration. For example, custom MICROSOFT™ Windows file system drivers exist which can be used to read data from the ext3 Linux file system. However, this workaround still has a number of additional drawbacks. First, auxiliary file data such as permissions and ownership attributes is lost when processing, transferring, and saving the restored file to a different, target OS and file system. Secondly, additional third party drivers are known to often negatively affect system stability. Finally, this solution also imposes a high cost of development and maintenance due to the need to update the tool being used for restores when a file system format changes due to updates, or upgrades or when there is a need to support another file system type due to the introduction of new file system types preserved on the restored file.

Therefore, there is a need for an efficient low cost method of object level backup restoration that supports multiple file systems. What is further needed are systems for object level backup restorations from image level backups having various file system types, wherein file attributes such as permissions and ownerships are preserved.

SUMMARY OF THE INVENTION

Embodiments of the present invention include methods, systems, and computer program products for recovering any file system object from an image level backup without requiring the backup and recovery application to be installed on a computer running the OS that supports the virtual disk file system type backed up in the image level backup. Example methods for restoring data objects from an image level backup are described in U.S. Patent Provisional Application No. 61/250,586, filed on Oct. 12, 2009, entitled "Item-Level Restoration From Image Level Backup," which is incorporated by reference herein in its entirety.

Embodiments of the present invention enable cross-platform object level restoration from an image level backup without having to fully extract a virtual disk image from the backup before it is mounted to a computer running the OS that supports the file system of the original (source) computer which image level backup is being restored from. Embodiments of the invention enable restoration of individual files without having to run the restoration process in an OS which supports a mounted virtual disk file system. Embodiments of the invention operate in a cross-platform environment wherein the platform (hardware, OS and file system) of original (source) computer and destination (target) where files are to be restored can differ from the platform used to perform object level restoration from an image level backup.

Embodiments of the invention additionally include methods for preserving file information such as, but not limited to file permissions, ownership, and attributes during the restoration process, even in cases where the target or destination OS and file system for the restored data objects differs from the OS and file system of the platform used to perform the restoration.

Embodiments of the invention achieve at least three key improvements over traditional file restoration techniques.

First, embodiments of the invention preserve file attributes at a restoration point. In an embodiment of the invention, a restoration point is a point in time when the backup was run. While file information such as permissions, ownership, and other attributes for backed up files are available to some traditional backup tools, embodiments of the present invention improve upon traditional techniques by preserving file information even in cases where the OS and file system of the original 'source' computer which image level backup is being restored from is different than the OS and file system of a computer used to perform object level restoration. For example, embodiments of the present invention preserve file attributes for files from a UNIX or Linux image level backup even when a Windows server or computer is used to run the software program that restores data objects from the image level backup. As described in detail below, embodiments of the invention implement this first improvement by restoring a file directly from its native operating system (OS) and file system to the target OS and file system, bypassing computer running the backup and recovery software.

Secondly, embodiments of the invention restore files from an image level backup without using third party file system drivers to read the image level backup. As described in detail below, embodiments of the invention implement this second improvement by mounting a virtual disk image to a virtual machine (VM) appliance that reads image level backups. This improvement avoids system instability issues introduced as a result of using third party drivers to read backups.

Lastly, embodiments of the invention decrease development and maintenance costs because multiple file system drivers or server platforms running multiple operating systems (OSs) and file systems are not needed in order to restore files from image level backups of disparate OSs and file systems.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit (s) of a reference number identifies the drawing in which the reference number first appears.

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of hardware, software, firmware, non-transitory computer readable media having instructions stored thereon, or a combination thereof and may be implemented in one or more computer systems or other processing systems, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Unless specifically stated differently, a user, a restore operator, and an administrator are interchangeably used herein to identify a human user, a software agent, or a group of users and/or software agents. Besides a human user who needs to perform object level restorations, a software application or agent sometimes needs to restore files. Accordingly, unless specifically stated, the terms "operator," "administrator," and "user" as used herein do not necessarily pertain to a human being.

As used herein, in an embodiment, the term "server" encompasses computing devices that are designed to function as one or more of file servers, email servers, Domain Name System (DNS) servers, Domain Controller (DC) servers, application servers, database servers, web servers, firewall servers, and other enterprise servers, and back end servers. A server may be comprised of one or more server machines. A server may be implemented as collection of servers such as a server farm or server cluster. For example, web servers may be commercially available server machines with one or more central processing units (CPUs). Alternatively, these web servers may comprise multiple computing devices and/or computing functionality hosted on multiple server machines (i.e., a server farm).

Figure 1:
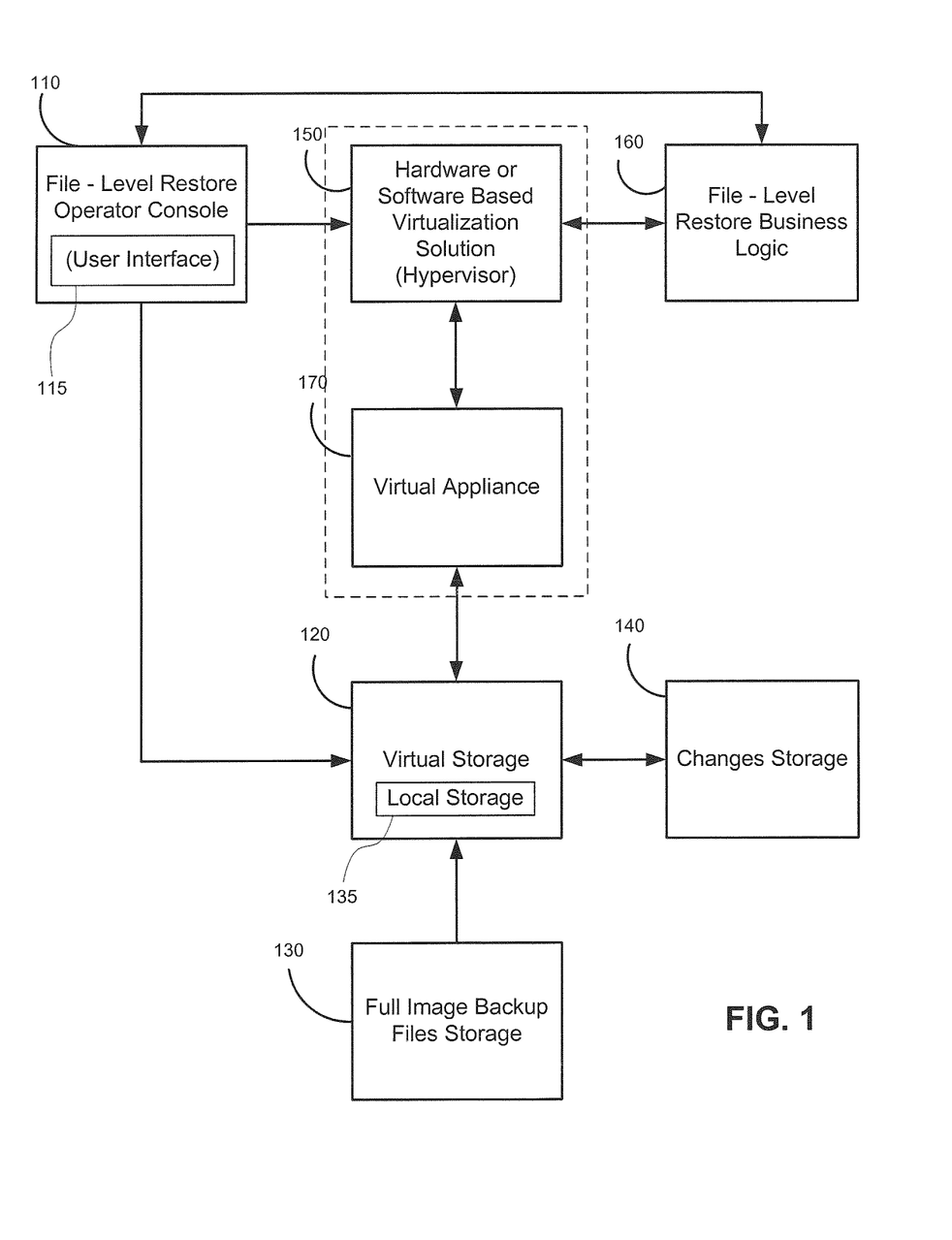
FIG. 1 illustrates a system architecture for cross-platform object level restoration, in accordance with an embodiment of the present invention.

The present invention relates to improved systems, methods, and computer program products for cross-platform object level restoration from image level backups.
Object Level Restoration Architecture FIG. 1 depicts system architecture 100 for object level restoration from an image level backup, in accordance with an embodiment of the invention. An operator console 110 includes a user interface (UI) 115 for object level restoration operators. In an embodiment, the UI 115 may be displayed on computer display 1030 shown in FIG. 10. UI 115 can be used to select an image level backup to restore files from, a restoration point, individual file system objects to be restored, and a destination target for the restoration. Operator console 110 can also be used to configure and manage system 100.

In embodiments of the invention, a virtual storage 120 can be implemented in the form of a process, a software agent, an application, a virtual machine (VM), hardware, a software appliance, or a combination of hardware and software that allows representing either the entire or partial raw data content of a requested image level backup. In an embodiment, virtual storage 120 is an application or process that enables representation of either the entire (or partial) raw data content of the required virtual disk file from image level backup file located in local storage 135 or full image backup files storage 130.

As used herein, "virtual storage" refers to logical storage that has been abstracted and separated from physical storage, such as network-attached storage (NAS), file servers, disks, and other physical storage devices. In an embodiment, virtual storage is implemented via virtual storage logic and is viewable within an infrastructure as a storage device containing one or more virtual disk files, which are separated from physical storage disks.

As used herein, a "virtual machine" (VM) is a software implementation of a machine such as a server, computer, or other computing device that supports the execution of a complete operating system (OS) and executes application programs like a physical machine. A VM duplicates the functionality of a physical machine implemented in hardware and software. Software applications and the OS running on a VM are limited to the resources and abstractions provided by the VM. In an embodiment, virtual machines (VMs) are viewable within an overall virtual infrastructure. According to an embodiment of the invention, the selected backup file to be restored can be located in local storage 135 or image-level backup files storage 130. Virtual storage 120 can be made available to data consuming processes as local volume, or as remote storage via public or proprietary storage access protocols such as, but not limited to the Network File System (NFS), Common Internet File System (CIFS), and Internet Small Computer System Interface (iSCSI).

The operator console 110 uses hypervisor 150 with an image of a specially crafted virtual appliance 170. Virtual appliance 170 is a pre-built and pre-configured VM that runs an OS supporting the file systems of the restored virtual disk image. According to an embodiment of the invention, virtual appliance 170 may be implemented as a VM running a Linux OS with components that can understand a number of Linux, UNIX, Windows, and other file systems. Appliance would typically have minimal set of OS components besides OS kernel to make it boot up very fast, and keep the appliance size small. In one embodiment, the application on virtual appliance 170 may have some of the functionality of the BusyBox utility, which provides multiple UNIX system tools with tiny footprint on the size of the system. As would be apparent to one of skill in the art, other utilities and OSs can be used for virtual appliance 170 as well. For example, virtual appliance 170 runs an OS corresponding to the OS and/or platform information of the source of the virtual disk image and the destination system the file system objects are to be restored to. Existing virtual computer can also be leveraged in addition to dedicated, purpose-build appliance. In an embodiment, virtual appliance 170 includes a file system object transfer module enabling virtual appliance 140 to copy the file system objects to be restored to the destination server (typically, original live server which backup is being restored). The file system object transfer module is configured to preserve the file system object information, such as, but not limited to, timestamps, permissions, and ownership information.

In accordance with embodiments of the invention, hypervisor 150 can be, but is not limited to virtual machine monitors (VMMs) such as VMWARE™ Player, MICROSOFT™ VirtualPC, SUN™ VirtualBox, VMWARE™ ESX/ESXi, MICROSOFT™ Hyper-V, CITRIX™ XENServer, PARALLELS™ and other hypervisors 150. As would be apparent to one of skill in the art, other hypervisors 150 and virtualization solutions can be used as well.

In accordance with embodiments of the invention, virtualization is used to enable cross-platform object level restoration without having to use a physical computer that runs the same native OS and supports the same file system(s) as the destination platform that the files are being restored to (i.e., the target or destination for the file restoration).

Restoration operator console 110 communicates with a virtual environment implemented on a virtual machine monitor (VMM) or hypervisor 150. As would be understood by one skilled in the relevant art(s), hypervisor 150 may be implemented as software or a combination of hardware and software to implement platform-virtualization software that allows multiple operating systems (OSs) to run concurrently on a single host computer. Virtual storage 120 is accessible by hypervisor 150 that support the same storage format as virtual storage 120 is configured to emulate. For example, virtual storage 120 can appear in the form of an NFS server in the case of VMWARE™ ESX hypervisor, or in the form of a CIFS server in the case of MICROSOFT™ HYPER-V hypervisor. According to an embodiment, hypervisor 150 performs virtual disk image read operations from virtual storage 120 and writes changed virtual disk data back to virtual storage 120, or directly to the changes storage 140. Changes storage 140 stores virtual disk image data changes inflicted by the item level restoration processes described herein. The written data can also be read back by hypervisor 150, in cases when hypervisor needs to access previously changed virtual disk image data blocks. Thus, the exposed images residing inside backup files remain read only and intact on the backup storage for the duration of the item level restoration process.

Virtual storage 120 handles these operations using appropriate formats and stores the modified virtual disk image data on changes storage 140. In accordance with embodiments of the present invention, changes storage 140 can be implemented in the following different ways. Changes storage 140 can be implemented as a part of virtual storage 120 logic by intercepting and re-directing write input/output (I/O) to the designated storage device. Changes storage 140 can also be implemented using native disk I/O redirection capabilities of hypervisor 150 (snapshot, non-persistent disk etc.), when all data changes inflicted during the restoration process are redirected to designated storage by hypervisor 150 itself, instead of being committed into a published disk image. In an embodiment, hypervisor 150 can create a snapshot of a disk image to protect the disk image from data changes associated with the backup verification process. Finally, changes storage 140 can be implemented using capabilities of remote backup files storage 130, for example, using storage area network (SAN) snapshots.

The operator console 110 communicates with a virtual environment implemented on a virtual appliance monitor or hypervisor 150. Virtual storage 120 is accessible by hypervisor 150 that uses the same virtual disk file format as stored in image level backup file. Hypervisor 150 performs read operations from virtual storage 120 to access virtual disks' data stored in the backup file. Hypervisor 150 performs read operations from virtual storage 120. Hypervisor 150 writes changed virtual disk data into virtual storage 120, or directly to changes storage 140. In accordance with embodiments of the present invention, changes storage 140 can be implemented in the following different ways. Changes storage 140 can be implemented using virtual storage 120 logic by intercepting and re-directing write input/output (I/O) using file system level drivers or similar I/O redirection techniques.

Changes storage 140 can also be implemented using 'snapshot' disk I/O redirection capabilities of hypervisor 150, when all data changes inflicted by the verification process are redirected to designated storage by hypervisor 150 itself, instead of being committed into a disk image. Finally, changes storage 140 can be implemented using capabilities of backup file storage 130, for example, using storage area network (SAN) snapshots. Changes storage 140 is used to store disk image data changes inflicted by object level restoration process described below with reference to FIG. 2. For example, changes storage 140 can be used to temporarily store disk data modification attempts while an object level restoration process or application is running. Data saved in changes storage 140 is not saved as persistent data. The written data can also be read back by hypervisor 150 from virtual storage 120. Thus, the exposed images residing inside backup files remain read only and intact on the backup storage for the duration of the object level restoration process.

Virtual storage 120 handles read operations using appropriate formats and stores the incoming data (by intercepting any data write attempts) on a temporary or persistent changes storage 140. According to embodiments of the invention, the redirection between virtual storage 120 and changes storage 140 can be implemented by file system level drivers or other I/O redirection techniques.

Once virtual storage 120 is fully initialized, commands entered via UI 115 can be received from operator console 110. In an embodiment, an operator can issue a command to configure virtual appliance 170 and attach the required virtual disk image files from virtual storage 120 to virtual appliance 170. Hypervisor 150 is then used to start up virtual appliance 170 normally.

During the boot up of virtual appliance 170, the OS for virtual appliance 170 automatically mounts all discovered file system volumes, including those stored in a virtual disk image inside the image backup file.

Once the boot-up process for virtual appliance 170 ends, virtual appliance 170 notifies restore business logic 160 via a network broadcast or other communications means. Restore business logic 160 then connects to the running virtual appliance 170 to display, in UI 115, the contents of the file system of the virtual disk image mounted by virtual appliance 170 for a restore operator. Restore business logic 160 then retrieves files selected by a restore operator in UI 115 of operator console 110 from the mounted volumes. The retrieved files are then transferred to a target or destination location (not shown) selected by the restore operator. The selected file system object(s) can be restored locally to operator console 110, to the original 'source' server, or to another remote server (not shown). Through virtualization achieved by virtual appliance 170, virtual storage 120, and hypervisor 150, files can be restored to a server with file systems matching the virtual environment used to perform the restore. In this way, architecture 100 preserves not only the original file contents, but also preserves additional file system object data like permissions and ownership. As would be apparent to one of skill in the art, file system object data can include, but is not limited to directory access right flags such as 'sticky bits' and directory and object level read, write, delete, and execute privileges. The file and directory level privileges preserved using architecture 300 can vary between users and groups.

Object Level Restoration Methods

Figure 2:
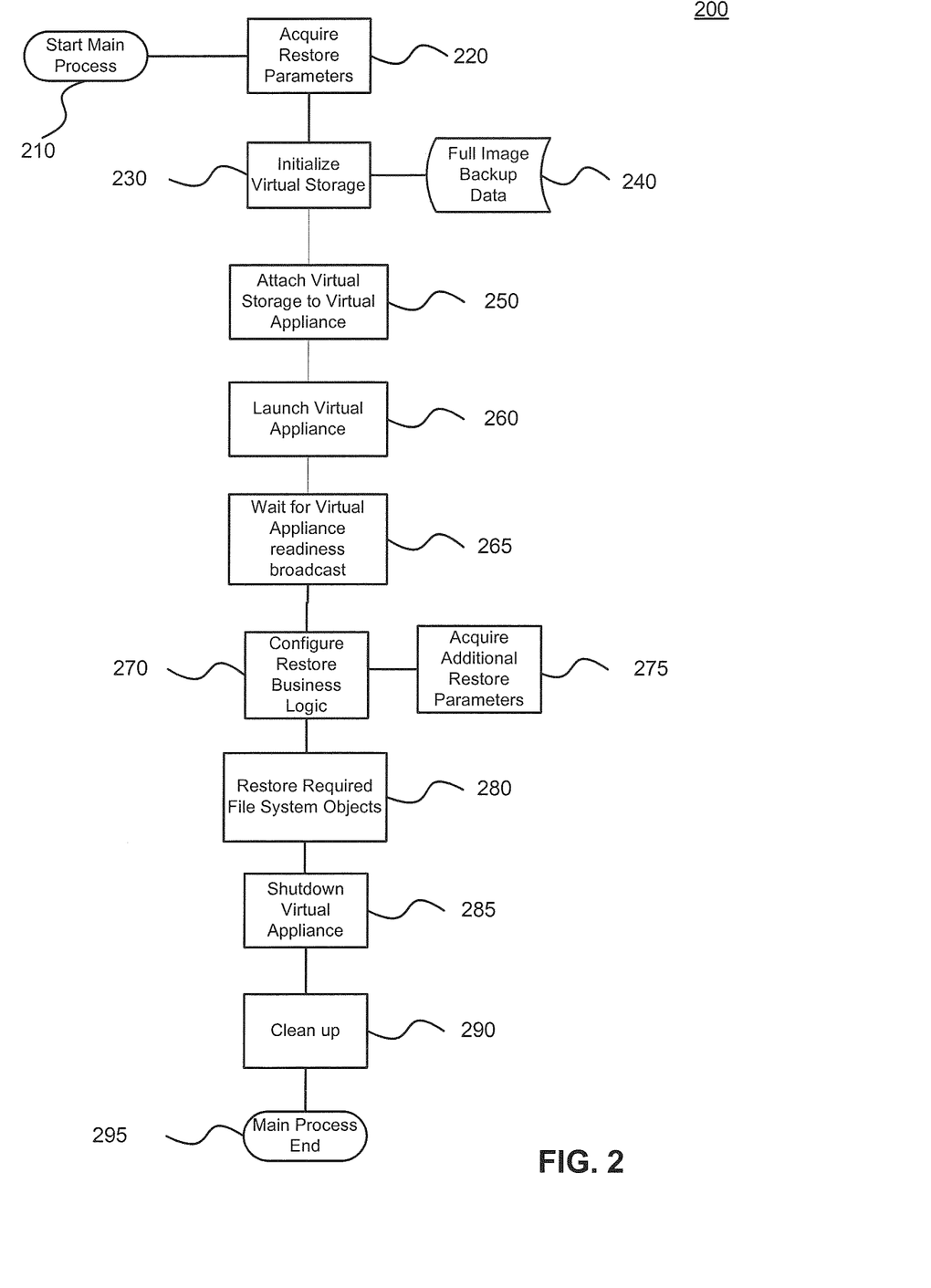
FIG. 2 is a flowchart illustrating steps by which cross-platform object level restoration is performed, in accordance with an embodiment of the present invention.

FIG. 2 is a flowchart 200 illustrating steps by which a method is used to perform object level restorations, in accordance with an embodiment of the present invention.

More particularly, flowchart 200 illustrates the steps by which object level restorations are performed using a virtual appliance and virtual storage, according to an embodiment of the present invention. FIG. 2 is described with continued reference to the embodiment illustrated in FIG. 1. However, FIG. 2 is not limited to that embodiment. Note that the steps in the flowchart do not necessarily have to occur in the order shown.

The method begins at step 210. In an embodiment, a file restoration application is started in step 210. After the process is started, the method proceeds to step 220.

In step 220, object level restoration parameters are received. The object level restoration parameters may include one or more of an image level backup file location, files to restore, and a restore point in cases where multiple backups for different points in time exist. In an embodiment, step 220 is performed after a restore operator, using operator console 110, specifies restore parameters, such as an image level backup file location, the computer from which data is restored from, and the restore point (in case of multiple backups). After receipt of the object level restoration parameters, the method proceeds to step 230.

In step 230, virtual storage 120 is initialized. In an embodiment, the operator console 110 initializes virtual storage 120 by starting a storage service or a process, and presenting the virtual disk image files corresponding to the specified computer and restore point via a data conversion engine that performs on-the-fly decompression, de-deduplication, decryption and any other operation required to translate backup file content into a raw disk data to return the requested disk blocks' data. After virtual storage 120 is initialized, the method proceeds to step 240.

In step 250, virtual storage 120 is attached to hypervisor 150. In an embodiment of the invention, step 250 is performed when a restore operator, using operator console 110, attaches required virtual disk files from virtual storage 120 to virtual appliance 170 by issuing the corresponding hypervisor VM configuration commands. Such attachment is analogous to mounting a physical disk drive (i.e., step 250 is a virtualization of mounting physical drives). After virtual storage 120 is attached to hypervisor 150, the method proceeds to step 260.

In step 260, a virtual appliance 170 is launched. In an embodiment, virtual appliance 170 is configured so that the configuration of its virtual disks refers to corresponding files on the virtual storage 120. Once the required virtual appliance 170 is launched, the method proceeds to step 265.

In step 265, the backup system waits for virtual appliance 170 to signal that its boot is fully complete and that it is ready to serve object level restore requests. Upon receipt of a signal from virtual appliance 170 indicating that it has fully booted and is available to satisfy object level restoration requests, the method proceeds to step 270.

In step 270, restore business logic 160 is configured. As a part of step 270, the contents of virtual appliance 170 volumes are displayed on operator console 110 in UI 115. In an embodiment, a restore operator is presented with the content of virtual appliance volumes, and in step 270, UI 115 within operator console 110 enables selection of the file system objects to be restored. The selection of file system objects may comprise acquisition of additional restore parameters in step 275. This step is performed by configuring restore business logic 160 to connect to the running virtual appliance 170 so that it can display the contents of the file system of the virtual storage attached in step 250 to a restore operator. In an embodiment, restore business logic 160 is a module configured to display the contents of the virtual storage without having to fully extract, decrypt, or decompress the image level backup. Example methods for displaying and verifying file system objects from an image level backup without fully extracting, decompressing, or encrypting the image level backup are described in U.S. Provisional Patent Application No. 61/302,743, filed on Feb. 9, 2010 titled "Systems, Methods, and Computer Program Products for Verification of Image Level Backups", which is incorporated herein by reference in its entirety. After the file system objects are displayed, restore business logic 160 then retrieves files selected by a restore operator in UI 115 of operator console 110 from the mounted volumes.

In step 275, additional restore parameters are received based on the configuration of restore business logic 160 performed in step 270. As discussed above with regards to step 220, the additional restore parameters acquired in step 275 may include one or more of file system objects to be fetched, location(s) for saving the restored file system objects, and additional recovery settings (for example, whether to copy file and directory permissions). After additional restore parameters are received, the method proceeds to step 280.

In step 280, restore business logic 160 fetches the required file system objects to be restored and saves the file system objects to a specified location. In an embodiment, the file system objects are files. Alternatively, the file system objects can be directories or folders. The file system objects retrieval process can be implemented using standard file copy tools provided by the OS running on Virtual Appliance 170. In an exemplary embodiment wherein virtual appliance 170 is running a Linux OS, virtual appliance 170 can issue Secure Copy (SCP) commands to copy file system objects to be restored from one computer to another. In alternative embodiments, proprietary utilities and agents can also be used to achieve faster transfer rates or add additional functionality such as network traffic compression. Alternatively, virtual appliance 170 can implement a server application such as, but not limited to the file transfer protocol (FTP) to provide users with access to the same data and enable users to perform self-restores of necessary file system objects using standard tools to interact with the corresponding server type, such as FTP clients. In an embodiment, restore business logic 160 can be implemented by issuing SCP command to copy file from virtual appliance 170 to the destination or target computer. Restore business logic 160 includes logic to preserve file system object information such as, but not limited to ownership; privileges; permissions, flags; and timestamps indicating create, edit, and modification times. According to an embodiment of the invention, restore business logic 160 includes logic to handle object level restorations where the source server is different from the target. For example, restore business logic 160 is configured to handles cases where a source server's user identifier (UID) or group identifier (GID) indicated in file system object information does not exist on the target server. For example, in cases where the source and destination are different servers, if a file system object to be restored is owned by a user and/or group that exists on the source and does not exist on the target/destination, restore business logic 160 preserves the ownership information by creating the user and/or group on the target server. In an embodiment, restore business logic 160 is configured to negotiate cases where a unique numeric identifier for a UID and/or GID from the source server is already in use on the target, but indicates a different user name and/or group name. For example, if a UID or GID from the source server is already 'taken' on the destination host or server by a different user name or group name, restore business logic 160 negotiates the differences between the source and destination to preserve the file system object information when the file system object is copied to the destination. In accordance with an embodiment of the invention, restore business logic 160 can run as a module or process on a remote computer (not shown). For example, restore business logic 160 can run as a module on the destination host. Alternatively, restore business logic 160 can execute as a process directly inside virtual appliance 170. After the file system object restoration process has completed, the method proceeds to step 285.

In step 285, virtual appliance 170 is shut down. After virtual appliance 170 is shut down, the method proceeds to step 290.

In step 290, the configuration of virtual appliance 170 is cleaned up and changes storage 140 data is deleted. According to an embodiment of the invention, step 290 comprises cleaning up virtual appliance 170 by removing its mounted disks.

The application process is stopped in step 295.

Systems for Object Level Restoration

Figure 3:
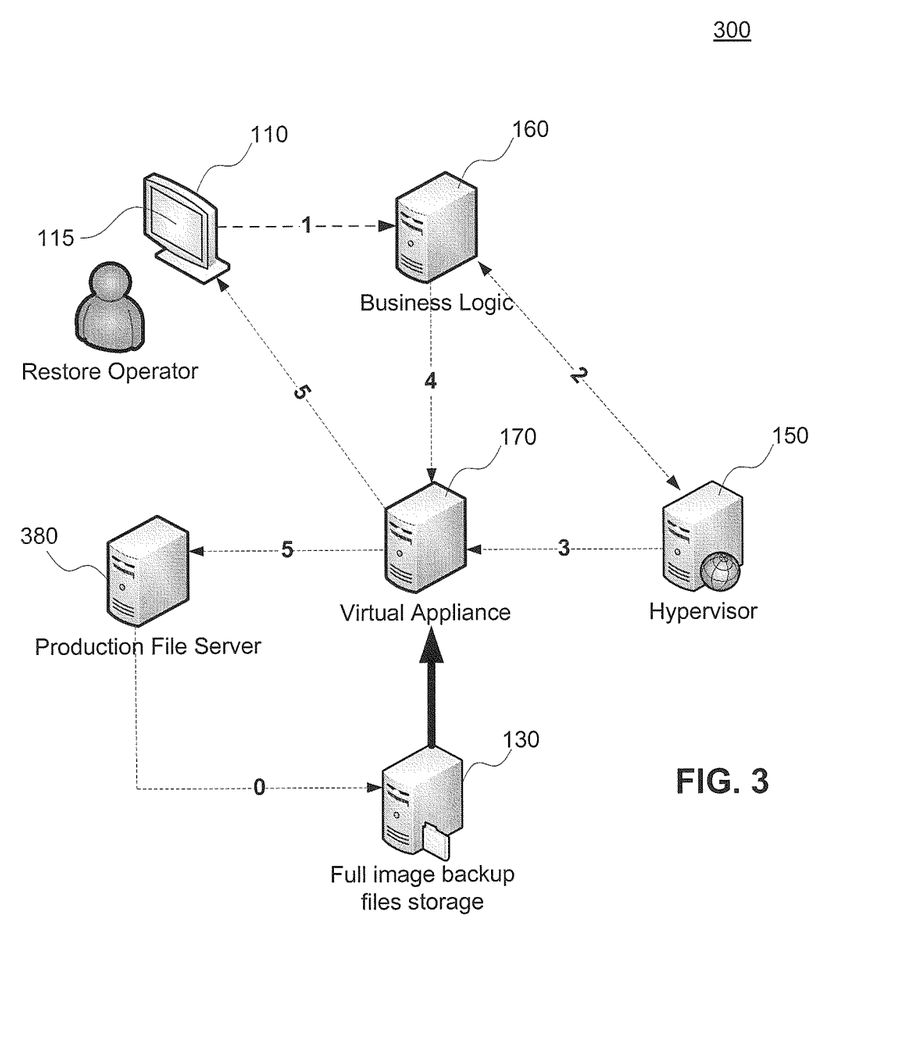
FIG. 3 illustrates an exemplary cross-platform object level restoration system, in accordance with an embodiment of the present invention.

FIG. 3 illustrates an exemplary system used for object level restoration. FIG. 3 is described with continued reference to the embodiments illustrated in FIGS. 1 and 2. However, FIG. 3 is not limited to those embodiments.

FIG. 3 illustrates an exemplary system 300 used for multi file-system object level restore procedure. The restore process is described in stages with reference to the elements of system 300.

Object level restoration system 300 includes a production server 380 that was the source of an image level backup stored on full image backup files storage 130 at a point in time. Production server 380 runs an OS that supports one or more file systems, which may differ from the file systems supported by the platform, used to support operator console 110 and UI 115. Although a single production server 380 is depicted in system 300, it is understood that multiple production servers 380 may be backed up and be the 'source' servers for image level backups. Similarly, multiple production servers 380 (not shown) may be destinations or targets for object level restores performed in stages 1-5, which are described below.

An image level backup of production server 380 is performed at stage 0 (i.e., at some point of time), and the resulting image level backup files are saved on full image backup files storage 130. In embodiments of the invention, image-level backup files storage 130 may be one or more of a file server, a group of file servers, Network-attached storage (NAS), a storage area network (SAN), or any other storage device.

In accordance with an embodiment of the invention, stage 1 is initiated in response to receiving a command to launch a multi file-system object level restoration user interface (UI). In an embodiment, UI is UI 115 within operator console 110. During stage 1, a restore operator starts a file-system object level restoration UI and chooses a backup file to perform an object level restore operation from. In one embodiment of the invention, VM selection interface 400 depicted in FIG. 4 and described below is used during stage 1. As a part of stage 1, system 300 displays all available VMs from the selected backup file.

At stage 2, the system modifies virtual appliance configuration to connect virtual disks files located on virtual storage 120 to virtual appliance 170, and launches virtual appliance on hypervisor 150. After selecting the VM for the object level restore, the user has the ability to choose any point in time of the backup to perform an object-level restore operation from. In one embodiment, restore point selection interface 500 depicted in FIG. 5 and described below is used to select a point in time for the object level restoration.

At stage 3, virtual appliance 170 is started. Then, after virtual appliance 170 signals that it has started, stage 4 begins. At stage 4, once virtual appliance 170 boots up, the user is presented with the content of volumes for the selected VM, and system 300 enables the user to choose which files to restore. In accordance with an embodiment of the present invention, file selection interface 600 depicted in FIG. 6 and described below is used to select files to restore.

At stage 5, a selection of a destination or target for the file(s) being restored is received via operator console 110. In an embodiment, a restore operator interacts with destination host selection interface 700 depicted in FIG. 7 to choose a destination to restore selected file system object to. The destination chosen in stage 5 can be the original source production server 380, another server, a remote storage device, or a local computer hosting operator console 110.

Figure 8:
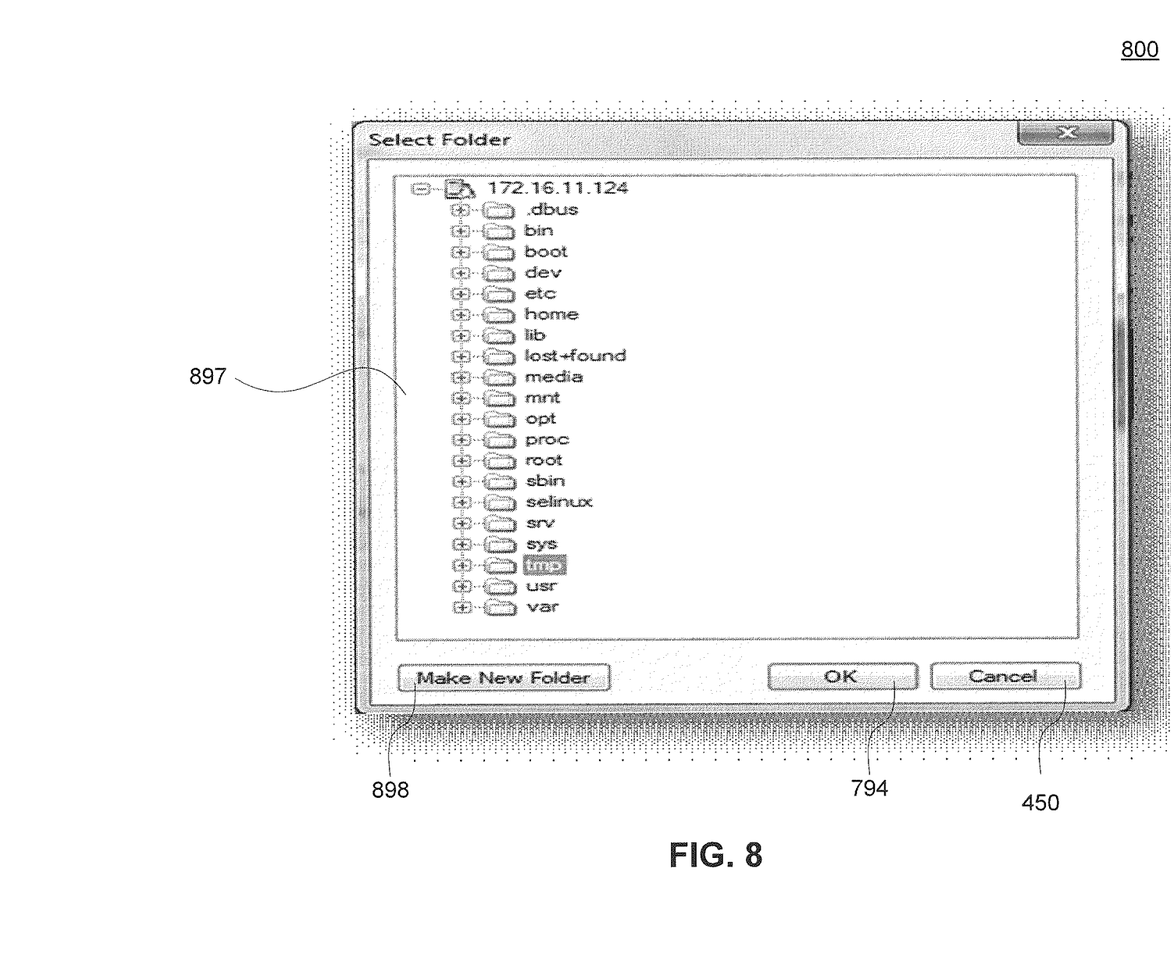

Upon successful connection to the destination target, a restore operator is able to browse the destination's file structure and select the destination folder to place the selected file system object(s) to. An exemplary UI for performing this selection is depicted in FIG. 8, which is described below.

During stage 5, after a restore destination is specified, the object level restore is performed by copying the selected file system object(s) from virtual appliance 170 to the restore destination. In the exemplary embodiment depicted in FIG. 3, the destination is production server 380. However, as discussed above, the destination or target may be another server or computer. An exemplary file restoration status interface 900 for displaying status of the copying is provided in FIG. 9, which is discussed below. In accordance with embodiments of the invention, file system objects are copied during stage 5 using the file transfer protocol (FTP), the Secure Copy protocol (SCP), the Secure File Transfer Protocol or (SFTP), or other file system object copying protocols and utilities which enable preservation of file system object information such as permissions and ownership. For example, copying using SCP in stage 5 can preserve file attributes such as timestamps of the last read or edit date of the file system objects being restored.

Once the restoration process is completed, virtual appliance 170 is shut down and hypervisor configuration is cleaned up.

Example Object Level Restoration User Interface

FIGS. 4-9 illustrate a graphical user interface (GUI), according to an embodiment of the present invention. The GUI depicted in FIGS. 4-9 is described with reference to the embodiments of FIGS. 1-3. However, the GUI is not limited to those example embodiments. For example, the GUI may be the UI 115 within operator console 110 used to select object level restoration parameters, as described in step 220 above with reference to FIG. 2. The GUI may also be a UI for hypervisor 150 used to launch virtual appliance 170 as described in step 260 above with reference to FIG. 2.

Although in the exemplary embodiments depicted in FIGS. 4-9 the GUI is shown as an interface running on a computer terminal, it is understood that the GUI can be readily adapted to execute on a display of other platforms such as mobile device platforms running various operating systems, or another display of a computing device. For example, in an embodiment of the invention, the GUI illustrated in FIGS. 4-9 can be displayed on a mobile device having an input device and a display.

Figure 4:
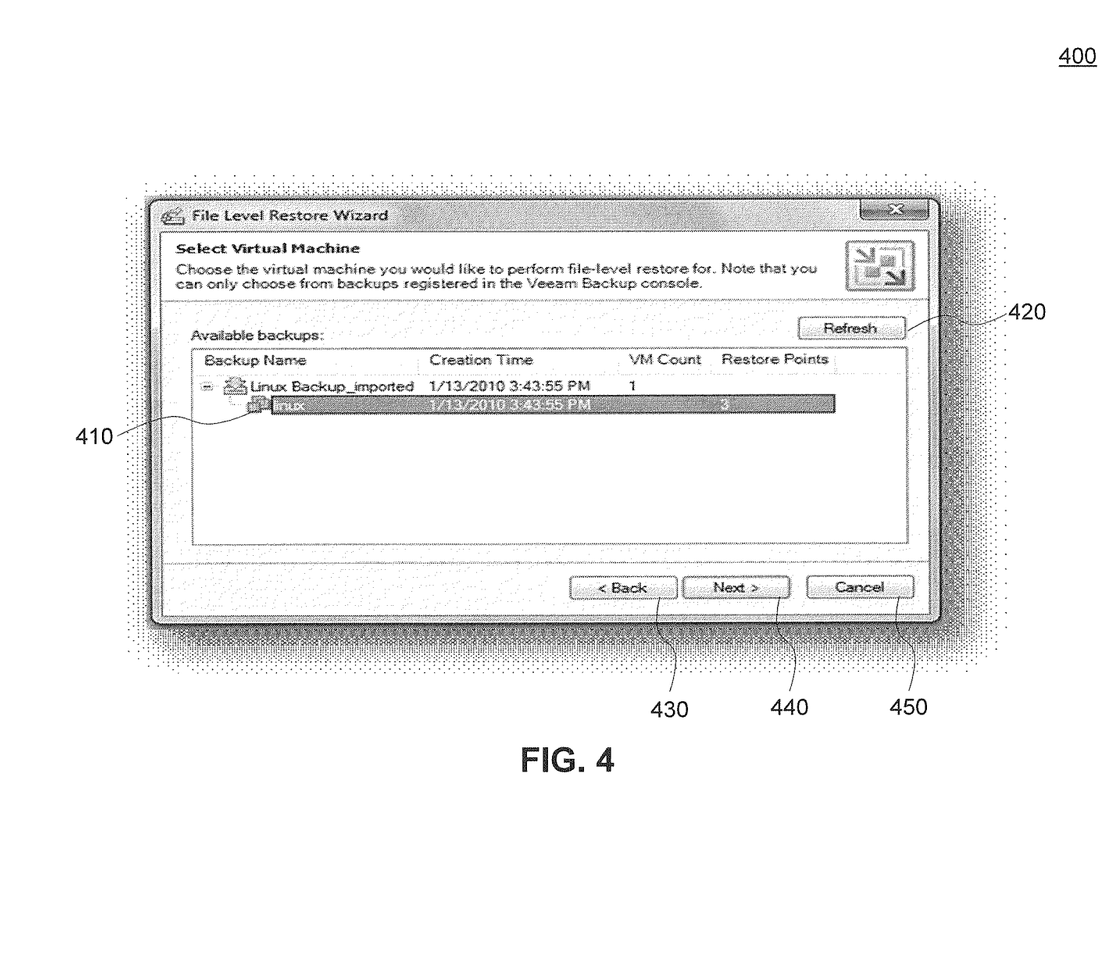
FIGS. 4-9 illustrate an exemplary graphical user interface (GUI), wherein object level restorations can be performed in a multiple platform environment, in accordance with an embodiment of the invention.

FIG. 4 illustrates an exemplary VM selection interface 400, wherein one or more VMs can be selected by a restore operator and displayed in command region 410. In response to receiving a selection of a backup file, VM selection interface 400 displays all available virtual machines (VMs) from the selected backup file. In an embodiment, a restore operator, using an input device (not shown), chooses an image level backup file to perform an object level restore operation from VM selection interface 400. For example, through moving a pointer or cursor within and between each of the command region 410 and buttons 420, 430, 440, and 450 displayed in a display, a restore operator selects a VM within a selected image level backup file. An object level restoration is subsequently performed using the VM selected in VM selection interface 400. In an embodiment, the display may be a computer display 1030 shown in FIG. 10, and selection interface 400 may be display interface 1002. According to embodiments of the present invention, the input device can be, but is not limited to, for example, a touch screen, a keyboard, a pointing device, a track ball, a touch pad, a joy stick, a voice activated control system, or other input devices used to provide interaction between a restore operator and VM selection interface 400.

In accordance with an embodiment of the invention, if Refresh button 420 is selected, a refreshed list of VMs is presented from a selected image level backup. VM selection interface 400 will display multiple VMs in cases where multiple computers were backed up in the selected image level backup. The displayed VMs can be selected by clicking in command region 410 and then clicking Next button 440. The current selection can be canceled by clicking on Cancel button 450. The Back button 430 can be selected to return to the previous screen and the Next button 440 can be used to navigate to the next screen of the GUI. If the user does not wish to use the VM(s) selected in VM selection interface 400, Cancel button 450 can be selected.

Figure 5:
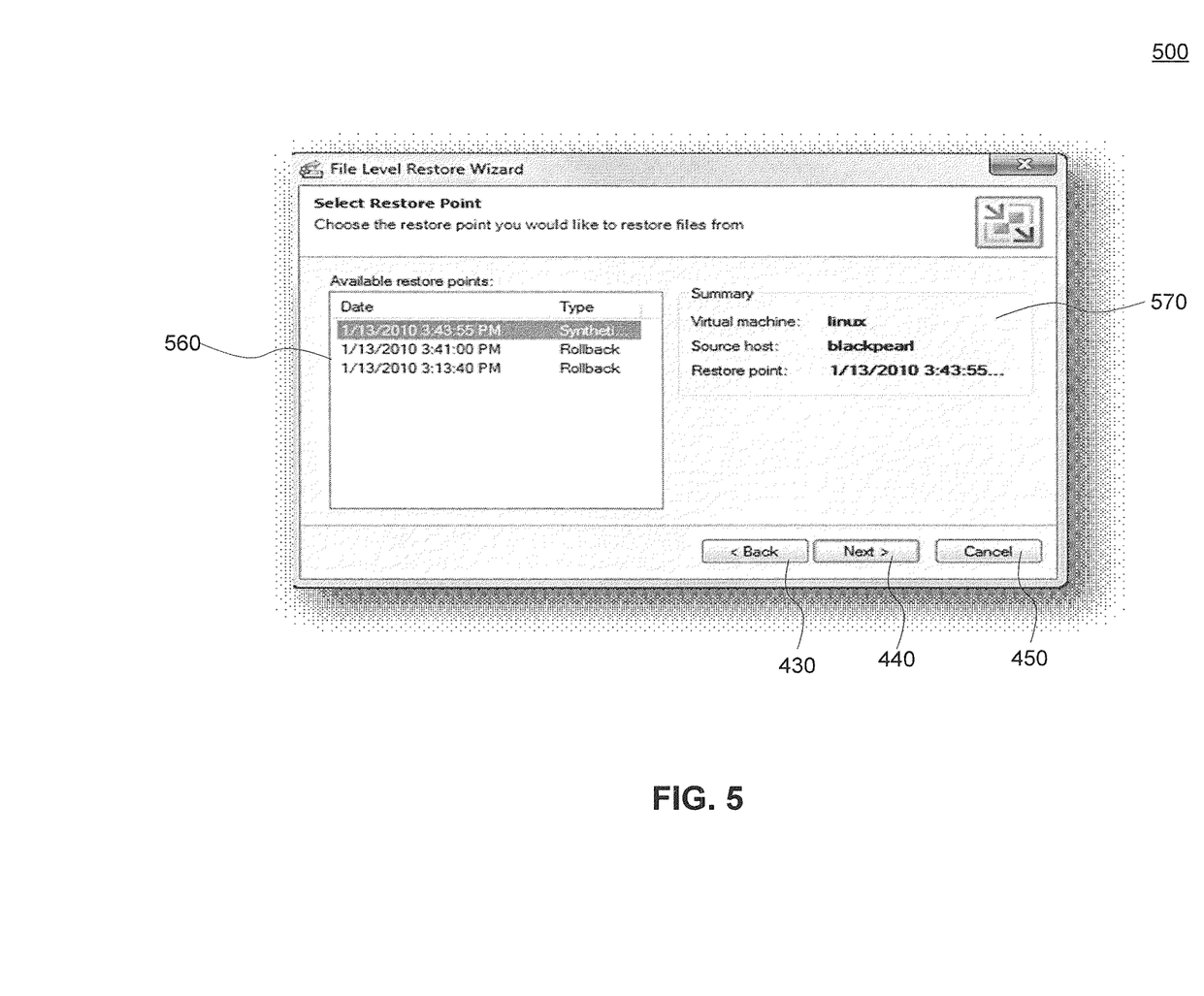

FIG. 5 illustrates an exemplary restore point selection interface 500, wherein a restore point can be selected by a restore operator in command region 560 and displayed in Summary pane 570. As shown in FIG. 5, one of a plurality of available points in time from the image level backup can be selected in command region 560. Summary information for the selected restore point is then displayed in Summary pane 570. In the exemplary embodiment depicted in FIG. 5, Summary pane 570 displays the VM name, the source host server name, and the restore point (as a time corresponding to when the backup was performed).

Figure 6:
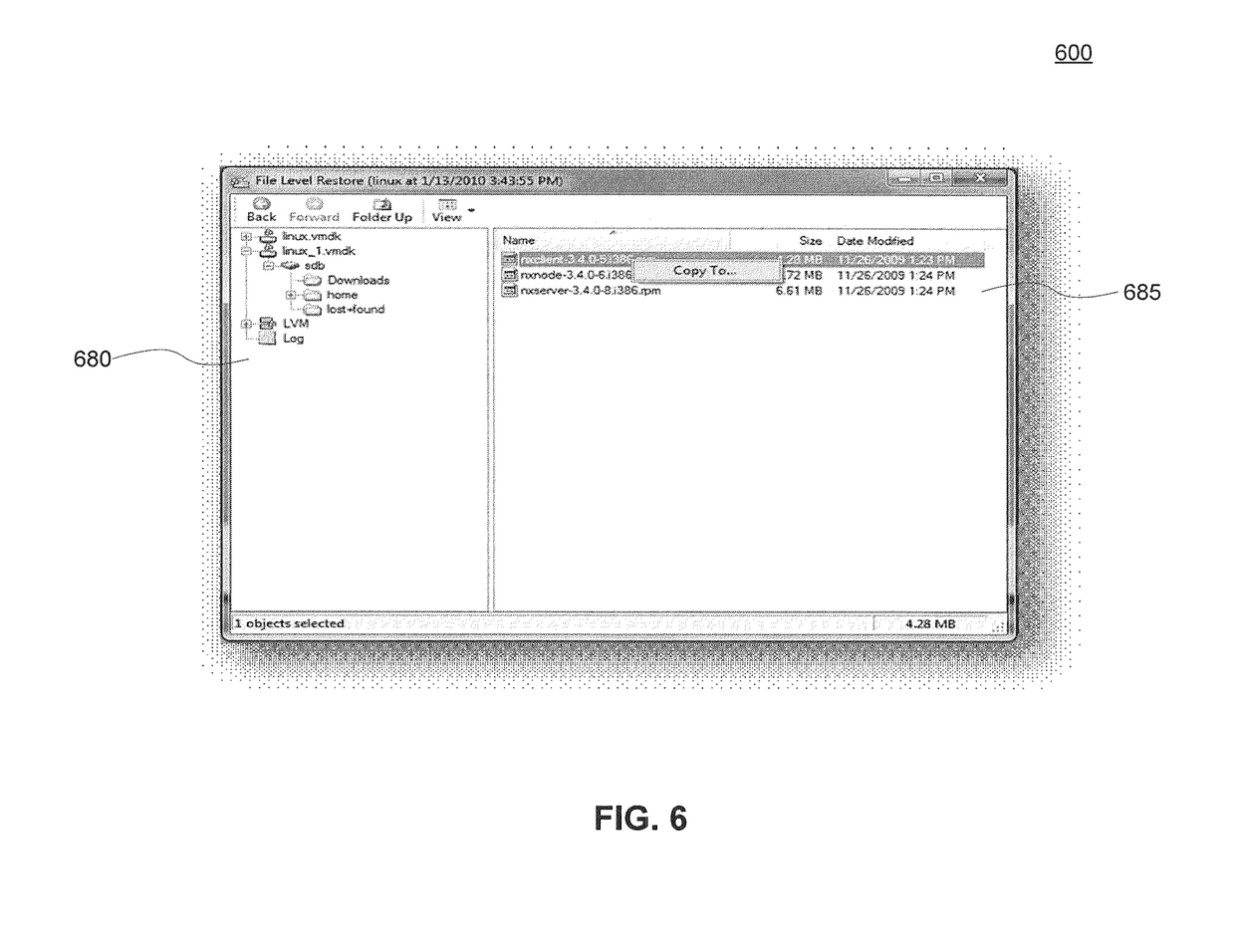

FIG. 6 illustrates an exemplary file selection interface 600 for displaying the contents of a virtual appliance volume, wherein one or more files to be restored from the volume can be selected by a restore operator in command region 680. Attributes and properties of the selected file system object(s) are displayed in file pane 685. As depicted in FIG. 6, a restore operator, can interact, using an input device, with command region 680 to navigate to files available for restoration from one or more virtual disks of the VM selected in VM selection interface 400. In the exemplary embodiment of FIG. 6, the names, sizes, and last modification times of files selected in command region 680 are displayed in file pane 685.

Figure 7:
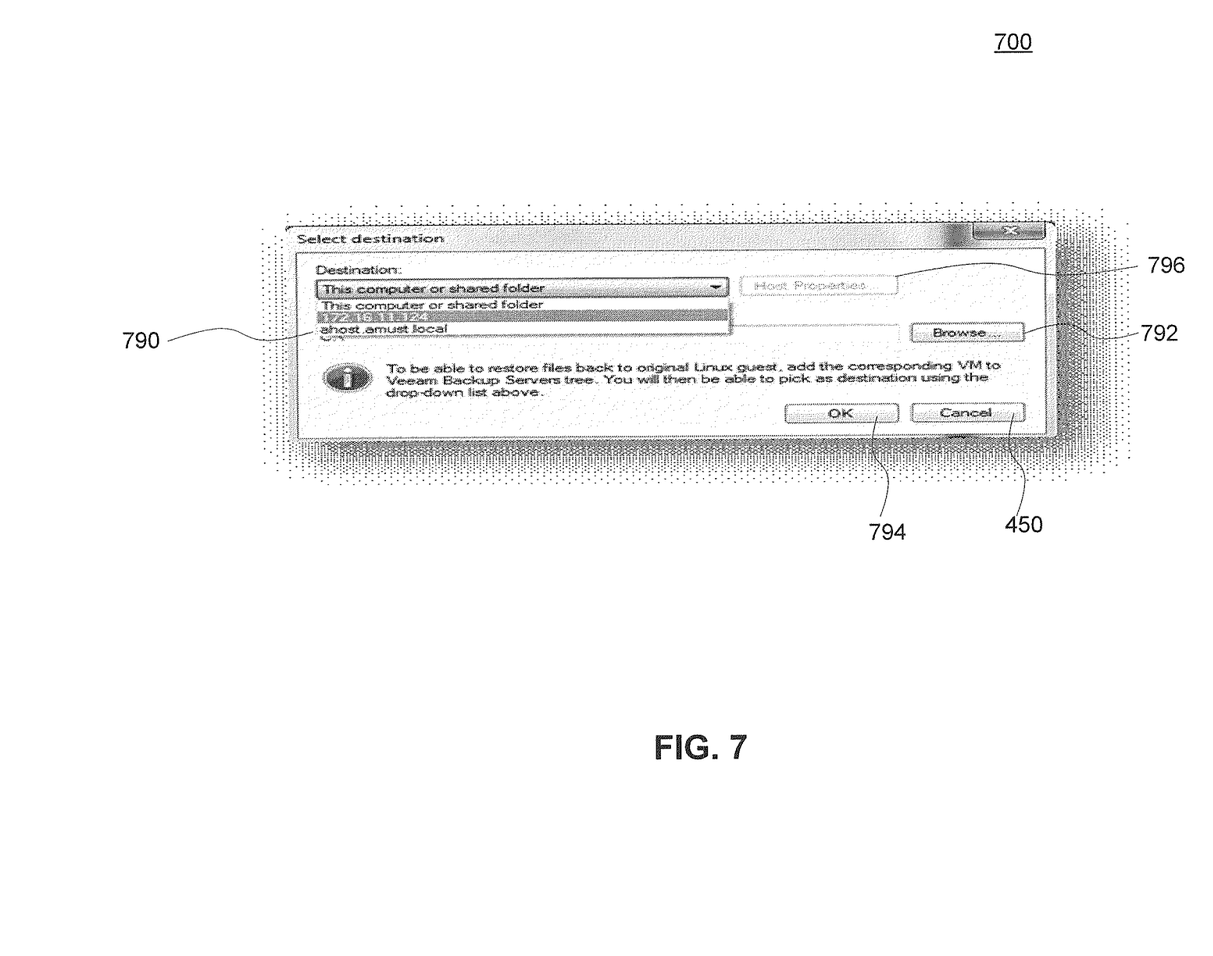

FIG. 7 illustrates an exemplary destination host selection interface 700, wherein one or more destinations can be selected by a restore operator in command region 790. Destination host selection interface 700 can be used to select a destination server or host to restore the file(s) selected in file selection interface 600 to. The destination selected in command region 790 can be the original production server 380 the backup was taken on, another server, another storage device, or a local computer that is hosting the GUI illustrated in FIGS. 4-9. Additional destinations can be displayed in command region 790 by clicking on Browse button 792. The displayed destinations can be selected by clicking in command region 790 and clicking OK button 794. Once a destination is selected, its properties (i.e., OS, supported file system(s), network address, et al) can be displayed by clicking on Host Properties button 796. The current destination selection can be canceled by clicking on Cancel button 450.

FIG. 8 illustrates an exemplary destination folder selection interface 800, wherein one or more destination folders or directories can be selected by a restore operator in command region 897. By interacting, using an input device, with command region 897, a restore operator can browse the file structure of the destination host selected in destination host selection interface 700 and select the destination folder(s) to place the file(s) selected in file selection interface 600 into. Alternatively, restore operator can click on Make New Folder button 898 to create a new folder or directory on the selected destination host.

Figure 9:
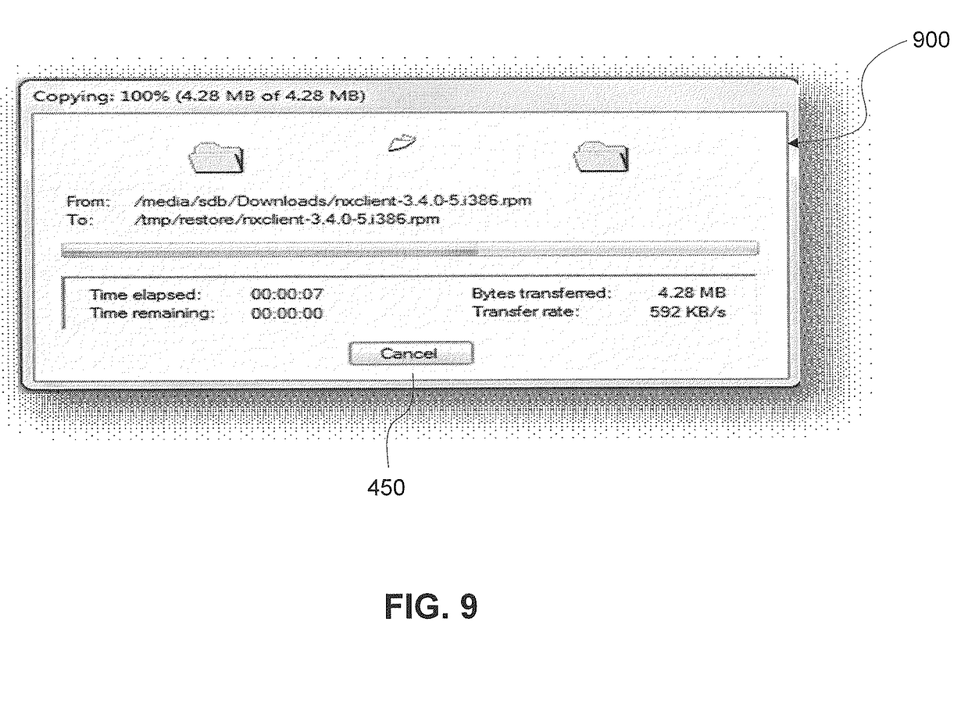

FIG. 9 illustrates an exemplary file restoration status interface 900. File restoration status interface 900 displays current information regarding the copying of the file(s) selected in file selection interface 600 to the destination folder selected in destination folder selection interface 800. In the exemplary embodiment depicted in FIG. 9, the source and destination directories for the file(s) being copied are displayed along with the elapsed time for the copying, estimated remaining time to complete the copying, bytes transferred, and the current network transfer rate. The file restoration can be canceled by clicking on Cancel button 450. As discussed above, once the file restoration is complete and 100% of the selected file system object(s) are copied, file information such as permissions and ownership on the destination host will match the file information from the source host where the backup was performed. In accordance with embodiments of the present invention, file and directory information is preserved even when the platform (OS and file systems) used to host the restoration process differs from the platform of the source host and the destination host.

Example Computer System Implementation

Figure 10:
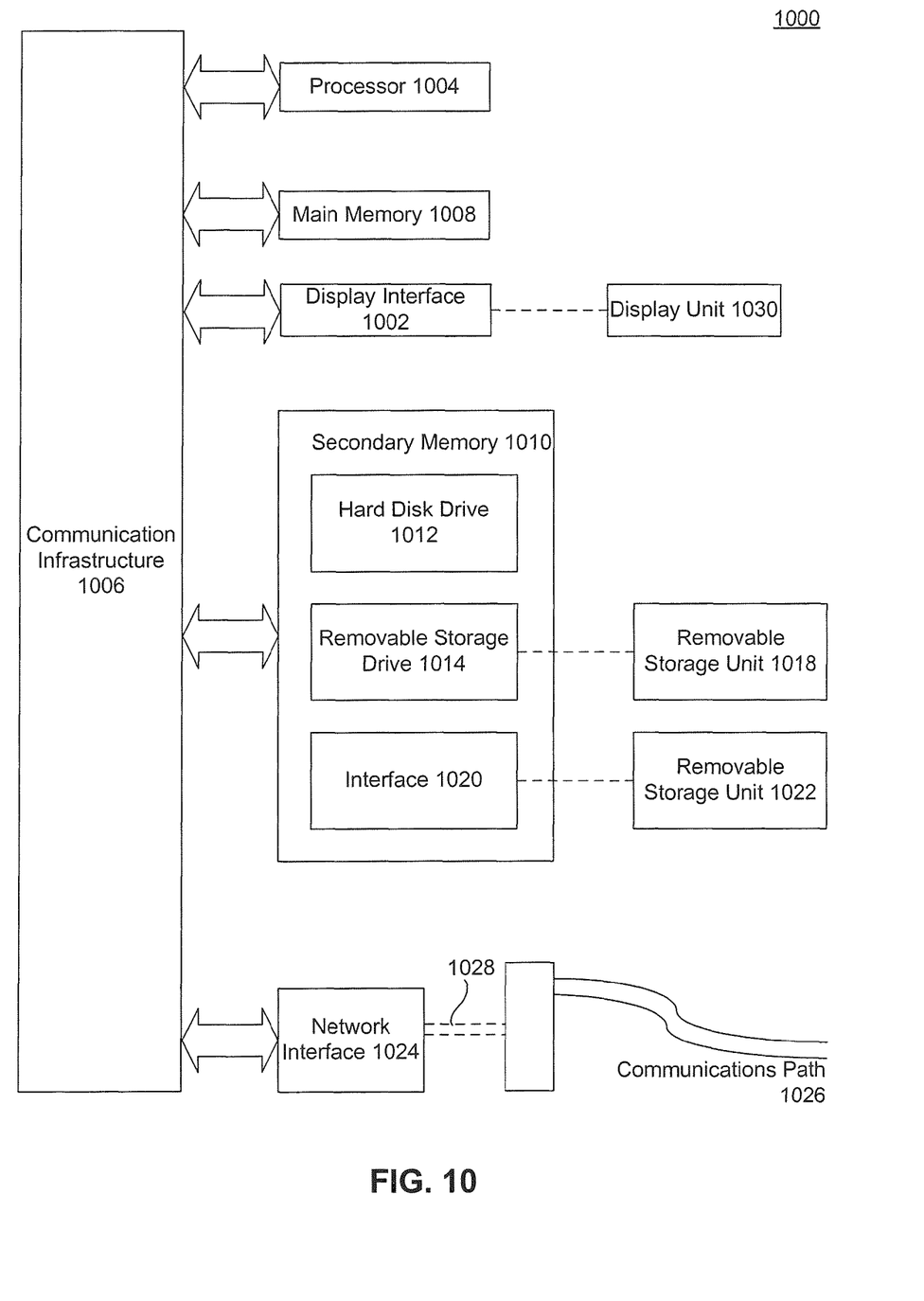
FIG. 10 depicts an example computer system in which the present invention may be implemented.

Various aspects of the present invention can be implemented by software, firmware, hardware, or a combination thereof. FIG. 10 illustrates an example computer system 1000 in which the present invention, or portions thereof, can be implemented as computer-readable code. For example, the methods illustrated by the flowchart 200 of FIG. 2 can be implemented in system 1000. Backup verification system 300 of FIG. 3 and can also be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general-purpose processor. Processor 1004 is connected to a communication infrastructure 1006 (for example, a bus, or network).

Computer system 1000 also includes a main memory 1008, preferably random access memory (RAM), and may also include a secondary memory 1010. Secondary memory 1010 may include, for example, a hard disk drive 1012, a removable storage drive 1014, flash memory, a memory stick, and/or any similar non-volatile storage mechanism. Removable storage drive 1014 may comprise a floppy disk drive, a magnetic tape drive, an optical disk drive, a flash memory, or the like. The removable storage drive 1014 reads from and/or writes to a removable storage unit 1018 in a well-known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a non-transitory computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals, which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

Computer system 1000 may additionally include computer display 1030. According to an embodiment, computer display 1030, in conjunction with display interface 1002, can be used to display UI 115 on operator console 110. Computer display 1030 may also be used to display the GUI interfaces depicted in FIGS. 5-8.

In this document, the terms "computer program medium," "non-transitory computer readable medium," and "computer usable medium" are used to generally refer to media such as removable storage unit 1018, removable storage unit 1022, and a hard disk installed in hard disk drive 1012. Signals carried over communications path 1026 can also embody the logic described herein. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowchart 200 of FIG. 2 and system 300 of FIG. 3 discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012, or communications interface 1024.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system for restoring a file system object from an image level backup, comprising:
    a processor configured to execute a first operating system (OS) that uses a first file system, the first OS configured to implement a restore console,
    wherein the restore console is configured to receive a selection of an image level backup and restoration parameters,
    wherein the image level backup is associated with a second OS and a second file system of a source production server of the image level backup, the second file system being different from the first file system, and
    wherein the restoration parameters include:
        a selection of at least one file system object of the image level backup; and
        a selection of a destination host to which the at least one file system object is to be restored, and
    a virtual appliance comprising:
        a file system module comprising a plurality of components, each component being compatible with a respective file system, wherein a first component of the plurality of components, compatible with the second file system, is configured to read the image level backup to determine a content structure of the image level backup; and
        a file system object transfer module configured to copy the at least one file system object from the image level backup to the destination host based on the determined content structure,
    wherein the virtual appliance is coupled to a hypervisor configured to launch the virtual appliance.

2. The system of claim 1, further comprising:
    a changes storage configured to store virtual disk data changes caused by restoration of the at least one file system object to the destination host,
    wherein the changes storage is implemented using backup file storage capabilities.

3. The system of claim 2, wherein the hypervisor has disk input output (I/O) redirection capabilities, and wherein the changes storage is implemented using the hypervisor disk I/O redirection capabilities, and wherein the hypervisor disk I/O redirection capabilities include the capability to create snapshots.

4. The system of claim 1, wherein the restoration parameters further comprise platform information associated with the source production server of the image level backup, the platform information including the second OS and the second file system.

5. The system of claim 4, wherein the file system object transfer module comprises a server application corresponding to the platform information associated with the source production server of the image level backup, the server application enabling selection and copying of the at least one file system object to the destination host.

6. The system of claim 1, wherein the file system object transfer module comprises file copy commands.

7. The system of claim 1, further comprising:
    a restore business logic module, coupled to the hypervisor configured to restore, using the restoration parameters and the file system object transfer module, the at least one file system object to the destination host.

8. The system of claim 7, wherein the restore business logic module is configured to preserve file system object information associated with the restored at least one file system object, the file system object information corresponding to the second OS and the second file system.

9. The system of claim 8, wherein the file system object information comprises timestamp information, permission information, and ownership information.

10. The system of claim 9, wherein the ownership information indicates a user identifier (UID) that owns the at least one file system object on the source production server of the image level backup.

11. The system of claim 9, wherein the ownership information indicates a group identifier (GID) that owns the at least one file system object on the source production server of the image level backup.

12. The system of claim 9, wherein the permission information indicates user privileges or group privileges for the at least one file system object, and wherein the user privileges or group privileges include at least read, write, and delete privileges.

13. The system of claim 1, wherein the first OS does not support the second file system of the source production server of the image level backup.

14. The system of claim 1, wherein the first OS does not support at least one file system supported by the destination host.

15. The system of claim 1, wherein the file system object is a file or a directory.

16. A method for restoring a file system object from an image level backup, comprising:
    receiving, by a restore console compatible with a first operating system (OS) and a first file system, a selection of an image level backup, wherein the image level backup is associated with a second OS and a second file system of a source production server of the image level backup;
    receiving, by the restore console, restoration parameters, wherein the restoration parameters include:
        a selection of at least one file system object of the image level backup;
        a selection of a destination host to which the at least one file system object is to be restored;
    initializing a virtual storage;
    attaching the virtual storage to a hypervisor;
    launching a virtual appliance using the hypervisor, wherein the virtual appliance comprises:

a file system module comprising a plurality of components, each component being compatible with a respective file system; and a file system object transfer module;

reading the image level backup, by a first component of the plurality components of the file system module, compatible with the second file system, to determine a content structure of the image level backup; and copying, by the file system object transfer module, the at least one file system object from the image level backup to the destination host based on the determined content structure.

17. The method of claim 16, wherein the restoration parameters further comprise platform information associated with the source production server of the image level backup, the platform information including the second OS and the second file system.

18. The method of claim 16, further comprising:
attaching a changes storage to the virtual storage, wherein the changes storage is configured to store virtual disk data changes caused by restoration of the at least one file system object to the destination host; and restoring, using the received restoration parameters, the at last one file system object to the selected destination host, and wherein said restoring comprises preserving file system object information associated with the restored at least one file system object the file system objection information corresponding to the second OS and the second file system.

19. A non-transitory computer readable storage medium having instructions stored thereon that, in response to execution by a computing device, cause the computing device to perform operations comprising:

receiving, by a restore console compatible with a first operating system (OS) and a first file system, a selection of an image level backup, wherein the image level backup is associated with a second OS and a second file system of a source production server of the image level backup;

receiving, by the restore console, restoration parameters, wherein the restoration parameters include:
 a selection of at least one file system object of the image level backup; and
 a selection of a destination host to which the at least one file system object is to be restored;

initializing a virtual storage;
attaching the virtual storage to a hypervisor;
launching a virtual appliance using the hypervisor, wherein the virtual appliance comprises:
 a file system module comprising a plurality of components, each component being compatible with a respective file system; and
 a file system object transfer module;

reading the image level backup, by a first component of the plurality components of the file system module, compatible with the second file system, to determine a content structure of the image level backup; and copying, by the file system object transfer module, the at least one file system object from the image level backup to the destination host based on the determined content structure.

20. The non-transitory computer readable storage medium of claim 19, wherein the operations further comprises:
attaching a changes storage to the virtual storage, wherein the changes storage is configured to store virtual disk data changes caused by restoration of the at least one file system object to the destination host; and restoring, using the received restoration parameters, the at least one file system object to the selected destination host.

* * * * *